2,952,655
Patented Sept. 13, 1960

2,952,655
COATING COMPOSITION COMPRISING METHYL METHACRYLATE COPOLYMER AND POLYMERIZED ALPHA-METHYL STYRENE AND ALUMINUM STRUCTURE COATED THEREWITH

Edward S. Beck, Park Forest, Ill., assignor to Enterprise Paint Manufacturing Company, Chicago, Ill., a corporation of Illinois No Drawing. Filed May 4, 1955, Ser. No. 506,069

7 Claims. (Cl. 260—33.6)

This invention relates to coating materials and more particularly to a novel protective coating having outstanding attributes and characteristics as a coating material for use on metal artifacts, particularly of aluminum.

The production of such articles as storm windows, doors, rain gutters, down spouts, casement windows, and television antenna from aluminum has mounted rapidly in recent years due to the low weight, strength, sturdiness, resistance to rusting, and other admirable characteristics of this metal. There are, however, a number of properties of aluminum which detract to a certain extent from its complete desirability as a construction material for articles of the type above set forth. Among these properties may be mentioned the tendency of bright aluminum to corrode, tarnish, oxidize or pit when it is exposed to the weather. This is particularly important in industrial areas where gases, fumes, dusts and similar airborne products accelerate this type of deteriorating effect on aluminum surfaces; and in coastal areas, high humidity together with airborne salt has in general the same kind of deleterious effect.

If these aluminum articles are not protected against such attacks as above described they gradually lose their bright, smooth appearance, and indeed if the deterioration continues long enough the object may lose a substantial part of its functional utility as well.

A particularly aggravating effect occurs when items such as for example, aluminum windows, installed during construction of a building are subject to the spillage of plaster or mortar. If the plaster or mortar particles are allowed to dry on the aluminum, there results a permanent unsightly marking and spotting of the surfaces.

And it is also well known that any decorative and/or functional article made of aluminum which has been polished, and which is subject to handling, acquires in time a deposition of perspiration on the surfaces thereof which effects a tarnishing and corrosion of surfaces.

Despite the long felt need for a practical, economical and effective means for protecting bright aluminum surfaces from the ravages of the numerous materials which have an injurious effect thereon, to date there has been no completely satisfactory surface coating developed which meets the high performance standards required by the trade, and which is readily and economically applied. Accordingly, it is a principal object of the present invention to provide a novel, improved coating material particularly adapted for coating aluminum.

Another object is to provide coated aluminum products superior to those heretofore available.

Another object is to provide a novel coating composition adapted for dip application to aluminum artifacts.

A further object is to provide an economical coating material for aluminum which will resist to a degree heretofore unobtainable, the surface-deteriorating effects of plaster, mortar, cement, salt, spray, weathering and the like.

I have discovered, in accordance with the present invention that a coating composition comprising a copolymer of methyl methacrylate with at least one lower alkyl ester of methacrylic acid in which the alkyl group contains from 2 to 8 carbon atoms, preferably containing a suitable plasticizer, and the whole being dissolved in a suitable organic solvent will, when applied to aluminum by any means including dipping, spraying, flow-coating or the like provide adherent light-resistant, weather-resistant, and water-resistant coatings of outstanding adhesion, tenacity and strength.

Among the materials which may be used in the production of the coating of the present invention, may be mentioned the copolymers of the following compounds: methyl methacrylate, ethyl methacrylate, isobutyl methacrylate, N-butyl methacrylate, 2-ethyl hexyl methacrylate and the like. A useful, commercially available resin of the foregoing type is Acryloid B-66 manufactured by Rohm & Haas, and believed to be a copolymer composed of from 40 to 60% methyl methacrylate and 40 to 60% ethyl methacrylate.

Since the methacrylate copolymers having the best physical and chemical properties for the purposes of this invention do not necessarily have the most desirable, or even the necessary adhesive properties, it is frequently advisable to add a plasticizer to the composition for this purpose. The plasticizer is preferably selected so as to have a minimum softening action on the resulting film and to detract as little as possible from the resistance of the resulting film to the corrosive and staining properties of mortar, plaster, cement and the like. The plasticizer of preference, furthermore should be water white, free of any substantial tendency to discolor on ageing or on weathering and should be substantially non-volatile and insoluble in water in order to prevent leaching out on exposure and weathering.

Among the plasticizers which I have found especially effective in producing the outstanding coatings of this invention are polystyrene resins, i.e. polymolecular resins derived from alpha-methyl styrene, which have a preferred molecular weight of about 340–375. Such a resin is commercially available under the trade-name of Dow Resin 276-V-9.

The amount of plasticizer which may be used is variable and will depend on the characteristics of the individual plasticizer and of the methacrylate polymer composition selected, as those skilled in the art will readily appreciate. Generally speaking the amount of plasticizer may be from about 1 to about 49% by weight of the total vehicle solids.

Among the typical solvents which may be used in producing my novel coating composition are xylol, toluol, high-flash naphthas, as well as other aromatic hydrocarbons and mixtures of such aromatic hydrocarbons with aliphatic hydrocarbons, which have a Kauri-Butanol value upwards of about 50.

The following examples will illustrate a number of coating compositions which have been eminently suitable as protective coatings on aluminum windows although it is to be understood that the utility of the coating is not thereby restricted to such artifacts but may be used with extruded and otherwise shaped aluminum articles, including polished and unpolished products.

In these examples, the methacrylate polymer and its plasticizer were dissolved in the solvent and the resulting preparation was then ready for application, by spraying, dipping, to the article to be coated. All "parts" are parts by weight.

Example 1

| | Parts |
|---|---|
| 100% methacrylate polymer (Acryloid B-66) | 12.8 |
| Polystyrene resin (Dow 276-V-9) | 2.2 |
| Xylol | 84.95 |
| Deodorant oil | 0.05 |

Example 2

The methylacrylate polymer of Example 1 was replaced by a copolymer composition composed of approximately 40% methyl methacrylate and 60% ethyl methacrylate by weight. The other components and amounts were the same as in Example 1.

Example 3

The methacrylate polymer of Example 1 was replaced by a copolymer composition composed of 60% methyl methacrylate and 40% ethyl methacrylate, by weight, the other components and amounts thereof being the same as in Example 1.

Example 4

The methacrylate polymer of Example 1 was replaced by a copolymer composition composed of 90% methyl methacrylate and 10% of 2-ethyl hexyl methacrylate, by weight, with the other components and amounts being the same as in Example 1.

Example 5

The methacrylate polymer of Example 1 was replaced by a copolymer composed of 60% of methyl methacrylate, 30% of butyl methacrylate and 10% of isobutyl methacrylate, by weight, the other components of the mix being the same as in Example 1.

All of the coating composition represented by the foregoing examples when applied to bright aluminum by spraying were found to dry tack-free within 2 to 5 minutes at normal temperature ranges and provided extremely adherent, light-resistant, weather-resistant and water-resistant coatings.

It will be understood of course that variations in the foregoing compositions will readily suggest themselves to those skilled in the art. There are however certain preferable ranges and proportions which provide particularly useful coating compositions. Thus in the foregoing compositions the solids content of the coating composition may vary from about 10 to about 50 parts by weight. The ratio of methacrylate copolymer to plasticizer is preferably about 85% of methacrylate polymer to about 15% of plasticizer, although this may vary depending on the particular plasticizer used and the particular copolymer used as hereinbefore pointed out. With the polystyrene plasticizer of the type used in the foregoing specific examples the plasticizer content is preferably from about 1 part of plasticizer to about 25 parts of plasticizer by weight based on the methacrylate polymer.

And of course the deodorant oil may be omitted or replaced by other odor-masking agents if desired.

Since rubber or a rubber-like material is generally used as a cushioning agent in aluminum storm windows it is obviously desirable that any coating used on such windows be such that it has no deleterious effects on the rubber or on the bonding medium securing the rubber to the aluminum. The present composition is eminently satisfactory in this regard.

And the coating of the present invention is, as far as I know, uniquely adapted for application to, and unexpectedly effective in, aluminum structures, particularly such as aluminum storm windows which are subjected to considerable abuse. The coating maintains its water whiteness indefinitely, and dries tack-free rapidly even in unheated rooms (and in fact samples of 20-gauge aluminum panels dipped in the above coatings and then placed out-of-doors in weather of 10° F. dried tack-free within two minutes). A solids content of about 15% by weight is generally preferable, with the viscosity being 12" #4 Ford Cup, the latter viscosity being selected as being most suitable for dip or spray application.

Aluminum sheeting coated with one of the aforesaid coatings was unaffected after 600 hours exposure in an Atlas twin-arc weatherometer, this being roughly equivalent to two years of outdoor exposure.

In a further test of the efficiency of this coating material, it was applied to aluminum panels and dried for seven days at room temperature. Spots of finishing plaster were then spattered on the surface and dried for four hours. The panels were then placed in a humidity chamber at 100% relative humidity and 77° F. for fourteen days. After this period, the plaster could be readily removed without any damage whatsoever to the clear coating, and inspection 24 hours later showed no visible mark on the coating.

A test similar to the above was repeated using brick mortar in place of plaster with the same outstandingly good results.

While this invention is described in terms of particular ingredients, and ranges thereof, to be used, it is obvious that many modifications and variations in the nature and proportions of the ingredients may be made without departing from the spirit and scope of the invention, and only such limitations should be imposed as are indicated in the appended claims.

I claim:

1. An aluminum structure having a surface protected against the deteriorating effects of plaster, mortar, cement, saltspray, water, light and weathering by a thin, clear, transparent, water-white, tack-free protective film of a copolymer of methyl methacrylate with at least one lower alkyl ester of methacrylic acid in which the alkyl group contains from 2 to 8 carbon atoms, said copolymer being plasticized with an amount between 1 and 49% by weight of polymerized alpha-methyl styrene having a molecular weight of about 340–375 such that the copolymer film is strongly bonded to the surface of the aluminum, said polymerized alpha-methyl styrene being water-white, non volatile, insoluble in water and substantially free of a tendency to discolor with ageing and weathering, and the copolymer of lower alkyl methacrylate esters comprising the balance of the film.

2. A process of treating an aluminum surface to provide it with resistance to the surface deteriorating effects of plaster, mortar, cement, saltspray, water, light and weathering which process comprises the steps of applying to the aluminum surface a thin coating of volatile organic solvent containing dissolved therein about 10 to 50% by weight of (1) a copolymer of methyl methacrylate with at least one lower alkyl ester of methacrylic acid in which the alkyl group contains from 2 to 8 carbon atoms, and (2) a substantially permanent non-leaching plasticizer therefor comprising polymerized alpha-methylstyrene having an approximate molecular weight of 340–375, said plasticizer being equal in weight to about 1 to 25% by weight of the copolymer, and the solvent comprising the balance of the coating, then allowing the coating to dry to a tack-free state whereby there remains a clear, transparent water-white protective film strongly adherent to said surface and affording the desired protection.

3. A process according to claim 2 wherein the copolymer and plasticizer therefor are dissolved in the solvent in the approximate ratios of 15 weight parts of plasticizer per 85 weight parts of copolymer.

4. A coating composition for use in protecting aluminum from the surface deteriorating effects of plaster, mortar, cement, saltspray, weathering and the like which is comprised essentially of a copolymer of methyl methacrylate with at least one lower alkyl ester of methacrylic acid in which the alkyl group contains from 2 to 8 carbon atoms, and an amount of polymerized alpha-methyl styrene having an approximate molecular weight of 340–375 which is equal to about 1 to 25% by weight of the copolymer, said copolymer and polymerized alpha-methyl styrene being dissolved in volatile organic solvent and together comprising from about 10 to 50% by weight of the total composition, the solvent comprising the balance of said composition, said composition being capable, when applied as a thin coating on an aluminum surface of quickly drying at normal temperatures to a tack-free, water-white, clear transparent film which strongly adheres to the aluminum and is resistant to light, water and to the surface deteriorating effects of the aforesaid plaster, mortar, cement, saltspray, weathering and the like.

5. A coating composition according to claim 4 wherein the copolymer comprises by weight 90 percent methyl methacrylate and 10 percent 2-ethyl hexyl methacrylate.

6. A coating composition according to claim 4 wherein the copolymer comprises by weight 40 to 60 percent methyl methacrylate and 60 to 40 percent ethyl methacrylate.

7. A coating composition according to claim 4 wherein the copolymer comprises by weight 60 percent methyl methacrylate, 30 percent n-butyl methacrylate and 10% isobutyl methacrylate.

References Cited in the file of this patent

UNITED STATES PATENTS

| | | |
|---|---|---|
| 2,069,983 | Ubben | Feb. 9, 1937 |
| 2,137,636 | Barrett | Nov. 22, 1938 |
| 2,140,089 | Marasco | Dec. 13, 1938 |
| 2,204,517 | Strain | June 11, 1940 |
| 2,640,817 | Sheridan et al. | June 2, 1953 |

FOREIGN PATENTS

| | | |
|---|---|---|
| 504,279 | Canada | July 13, 1954 |

OTHER REFERENCES

Buttrey: "Plasticizers," pages 135–137, published by Interscience Publishers Inc., 1950.

Mattiello: "Protective and Decorative Coatings," volume 1, page 478, Wiley, 1941.